United States Patent
Nehl et al.

(10) Patent No.: US 9,657,699 B2
(45) Date of Patent: *May 23, 2017

(54) ACTUATOR WITH INTEGRATED FLUX SENSOR

(71) Applicant: GM GLOBAL TECHNOLOGY OPERATIONS LLC, Detroit, MI (US)

(72) Inventors: Thomas Wolfgang Nehl, Shelby Township, MI (US); Chandra S. Namuduri, Troy, MI (US); Avoki M. Omekanda, Rochester, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 16 days.

This patent is subject to a terminal disclaimer.

(21) Appl. No.: 14/645,492

(22) Filed: Mar. 12, 2015

(65) Prior Publication Data

US 2015/0267669 A1    Sep. 24, 2015

Related U.S. Application Data

(60) Provisional application No. 61/968,001, filed on Mar. 20, 2014.

(51) Int. Cl.
*F02M 51/06* (2006.01)
*F02M 63/00* (2006.01)
(Continued)

(52) U.S. Cl.
CPC .......... *F02M 51/005* (2013.01); *F02D 41/20* (2013.01); *F02D 41/402* (2013.01);
(Continued)

(58) Field of Classification Search
CPC ........ F02D 41/20; F02D 41/28; F02D 41/266; F02D 41/402; F02D 2041/2058; F02D 2041/2072; H01F 7/064; Y02T 10/44
(Continued)

(56) References Cited

U.S. PATENT DOCUMENTS 5,381,297 A    1/1995  Weber
5,831,809 A   11/1998  Schmitz
(Continued)

FOREIGN PATENT DOCUMENTS

CN    1799016 A    7/2006
DE    34 37 053 C2   6/1985
(Continued)

OTHER PUBLICATIONS

A. M. Pawlak, Transient Finite Element Modeling of Solenoid Actuators, IEEE Transactions on Magnetics, Jan. 1988, 270-273, vol. 24, No. 1.
(Continued)

*Primary Examiner* — John Kwon
*Assistant Examiner* — Johnny H Hoang

(57) ABSTRACT

An electromagnetic actuator includes an electrical coil and a high permeability magnetic flux path. The magnetic flux path includes a magnetic core, an armature and a flux return structure. The electromagnetic actuator further includes a flux sensor which is integrated within the actuator and is configured to detect a magnetic flux within the high permeability magnetic flux path.

26 Claims, 8 Drawing Sheets

(51) Int. Cl.
  *F02M 51/00* (2006.01)
  *H01F 7/06* (2006.01)
  *F02D 41/20* (2006.01)
  *F02D 41/40* (2006.01)
  *F02M 57/00* (2006.01)
  *F02D 41/26* (2006.01)
  *F02D 41/28* (2006.01)

(52) U.S. Cl.
  CPC .... *F02M 51/0671* (2013.01); *F02M 51/0689* (2013.01); *F02M 57/005* (2013.01); *F02M 63/0017* (2013.01); *H01F 7/064* (2013.01); *F02D 41/266* (2013.01); *F02D 41/28* (2013.01); *F02D 2041/2058* (2013.01); *F02D 2041/2072* (2013.01); *F02M 2200/08* (2013.01); *F02M 2200/20* (2013.01); *F02M 2200/24* (2013.01); *Y02T 10/44* (2013.01)

(58) Field of Classification Search
  USPC .............. 123/445, 472, 478, 490, 498, 499; 701/102, 105
  See application file for complete search history.

(56) References Cited

U.S. PATENT DOCUMENTS

| | | |
|---|---|---|
| 6,168,135 B1 | 1/2001 | Fochtman |
| 6,321,700 B1 | 11/2001 | Hein |
| 2002/0148442 A1* | 10/2002 | Fraenkle ............ F02M 47/027 123/446 |
| 2003/0184946 A1 | 10/2003 | Kolmanovsky |
| 2004/0246649 A1 | 12/2004 | Besen |
| 2007/0056784 A1* | 3/2007 | Joe ................ B60K 6/48 180/65.245 |
| 2007/0120332 A1* | 5/2007 | Bushko ................ B60G 3/01 280/5.508 |
| 2007/0285195 A1 | 12/2007 | Nehl |
| 2008/0204178 A1 | 8/2008 | Maranville |
| 2010/0018503 A1 | 1/2010 | Perry |
| 2011/0125391 A1 | 5/2011 | McAlister |
| 2012/0018262 A1 | 1/2012 | Winkler |
| 2012/0101707 A1 | 4/2012 | Kemmer |
| 2012/0239278 A1 | 9/2012 | Becker |
| 2012/0247428 A1 | 10/2012 | Grimminger |
| 2013/0113407 A1 | 5/2013 | Neelakantan |
| 2013/0133748 A1 | 5/2013 | Lehner |
| 2014/0069533 A1 | 3/2014 | Gorzen |
| 2014/0092516 A1 | 4/2014 | Koch |
| 2014/0110508 A1 | 4/2014 | Dames |
| 2015/0123662 A1 | 5/2015 | Yasui |
| 2015/0267660 A1 | 9/2015 | Nehl |
| 2015/0267661 A1* | 9/2015 | Namuduri .......... F02M 51/0689 239/585.1 |
| 2015/0267662 A1* | 9/2015 | Nehl .................... F02M 51/005 123/294 |
| 2015/0267663 A1 | 9/2015 | Namuduri |
| 2015/0267666 A1 | 9/2015 | Gopalakrishnan |
| 2015/0267667 A1 | 9/2015 | Namuduri |
| 2015/0267668 A1* | 9/2015 | Gopalakrishnan .. F02D 41/1401 239/585.1 |
| 2015/0267670 A1 | 9/2015 | Nehl |
| 2015/0285175 A1 | 10/2015 | Parrish |

FOREIGN PATENT DOCUMENTS

| | | |
|---|---|---|
| DE | 196 43 788 A1 | 5/1998 |
| DE | 199 21 938 A1 | 12/1999 |
| DE | 10 2007 053 877 B3 | 4/2009 |
| DE | 10 2011 083 007 A1 | 3/2013 |
| DE | 10 2012 208 781 B4 | 11/2013 |
| EP | 0 074 420 A1 | 3/1983 |
| EP | 1670005 A2 | 6/2006 |
| EP | 2336544 A1 | 6/2011 |
| JP | 10-311265 A | 11/1998 |
| JP | 2007-270658 A | 10/2007 |
| KR | 10-2002-0094494 A | 12/2002 |
| WO | WO 90-02872 A1 | 3/1990 |
| WO | WO 87-01765 A1 | 3/1997 |
| WO | WO 2015 143107 A1 | 9/2015 |
| WO | WO 2015 143109 A1 | 9/2015 |
| WO | WO 2015 143116 A1 | 9/2015 |

OTHER PUBLICATIONS

T. W. Nehl, ANTIC85: A General Purpose Finite Element Package for Computer Aided Design, IEEE Transactions on Magnetics, Jan. 1988, 358-361, vol. 24, No. 1.

* cited by examiner

ACTUATOR WITH INTEGRATED FLUX SENSOR

CROSS REFERENCE TO RELATED APPLICATIONS

This application claims the benefit of U.S. Provisional Application No. 61/968,001, filed on Mar. 20, 2014, the contents of which are incorporated by reference.

TECHNICAL FIELD

This disclosure is related to solenoid-activated actuators.

BACKGROUND

The statements in this section merely provide background information related to the present disclosure. Accordingly, such statements are not intended to constitute an admission of prior art.

Solenoid actuators can be used to control fluids (liquids and gases), or for positioning or for control functions. A typical example of a solenoid actuator is the fuel injector. Fuel injectors are used to inject pressurized fuel into a manifold, an intake port, or directly into a combustion chamber of an internal combustion engine. Known fuel injectors include electromagnetically-activated solenoid devices that overcome mechanical springs to open a valve located at a tip of the injector to permit fuel flow therethrough. Injector driver circuits control flow of electric current to the electromagnetically-activated solenoid devices to open and close the injectors. Injector driver circuits may operate in a peak-and-hold control configuration or a saturated switch configuration.

Fuel injectors are calibrated, with a calibration including an injector activation signal including an injector open-time, or injection duration, and a corresponding metered or delivered injected fuel mass operating at a predetermined or known fuel pressure. Injector operation may be characterized in terms of injected fuel mass per fuel injection event in relation to injection duration. Injector characterization includes metered fuel flow over a range between high flow rate associated with high-speed, high-load engine operation and low flow rate associated with engine idle conditions.

It is known to connect an external injector driver to a fuel injector via wires and/or cables. These wires have resistive drops and parasitic capacitances and inductances that interfere with current travelling from the injector driver to the fuel injector, thereby affecting high speed operation of the fuel injector. Additionally, parameters such as voltage, current and flux measurements within the fuel injector may be provided as feedback to the external injector driver. The accuracy of these feedback parameters may be impacted due to the distance these measurements must travel through the wires connecting fuel injector to the injector driver.

SUMMARY

An electromagnetic actuator includes an electrical coil and a high permeability magnetic flux path. The magnetic flux path includes a magnetic core, an armature and a flux return structure. The electromagnetic actuator further includes a flux sensor which is integrated within the actuator and is configured to detect a magnetic flux within the high permeability magnetic flux path.

BRIEF DESCRIPTION OF THE DRAWINGS

One or more embodiments will now be described, by way of example, with reference to the accompanying drawings, in which:

FIG. 1-2 illustrates a schematic sectional view of the activation controller integrated within the fuel injector of FIG. 1-1, in accordance of the present disclosure;

FIG. 1-3 illustrates a schematic sectional view of an injector driver of FIGS. 1-1 and 1-2, in accordance to the present disclosure;

FIG. 2 illustrates a non-limiting exemplary first plot 1000 of measured current and fuel flow rate and a non-limiting exemplary second plot 1010 of measured main excitation coil and search coil voltages for two successive fuel injection events having identical current pulses that are separated by a dwell time that is not indicative of being closely spaced, in accordance with the present disclosure;

FIG. 3 illustrates a non-limiting exemplary first plot 1020 of measured current and fuel flow rate and a non-limiting exemplary second plot 1030 of measured main excitation coil and search coil voltages for two successive fuel injection events having identical current pulses that are separated by a dwell time that is indicative of being closely spaced, in accordance with the present disclosure;

FIG. 6-1 illustrates transient flux concentration along a magnetic flux flow path in a schematic sectional detailed view of area 422 of FIG. 4, in accordance with the present disclosure;

FIG. 6-2 illustrates magnetic flux along a magnetic flux flow path during steady state in a schematic sectional detailed view of area 422 of FIG. 4, in accordance with the present disclosure; and FIG. 6-3 illustrates a schematic sectional detailed view of exemplary magnetic field sensor locations within area 422 of FIG. 4, in accordance with the present disclosure.

DETAILED DESCRIPTION

This disclosure describes the concepts of the presently claimed subject matter with respect to an exemplary application to linear motion fuel injectors. However, the claimed subject matter is more broadly applicable to any linear or non-linear electromagnetic actuator that employs an electrical coil for inducing a magnetic field within a magnetic core resulting in an attractive force acting upon a movable armature. Typical examples include fluid control solenoids, gasoline or diesel or CNG fuel injectors employed on internal combustion engines and non-fluid solenoid actuators for positioning and control.

Figure 1:
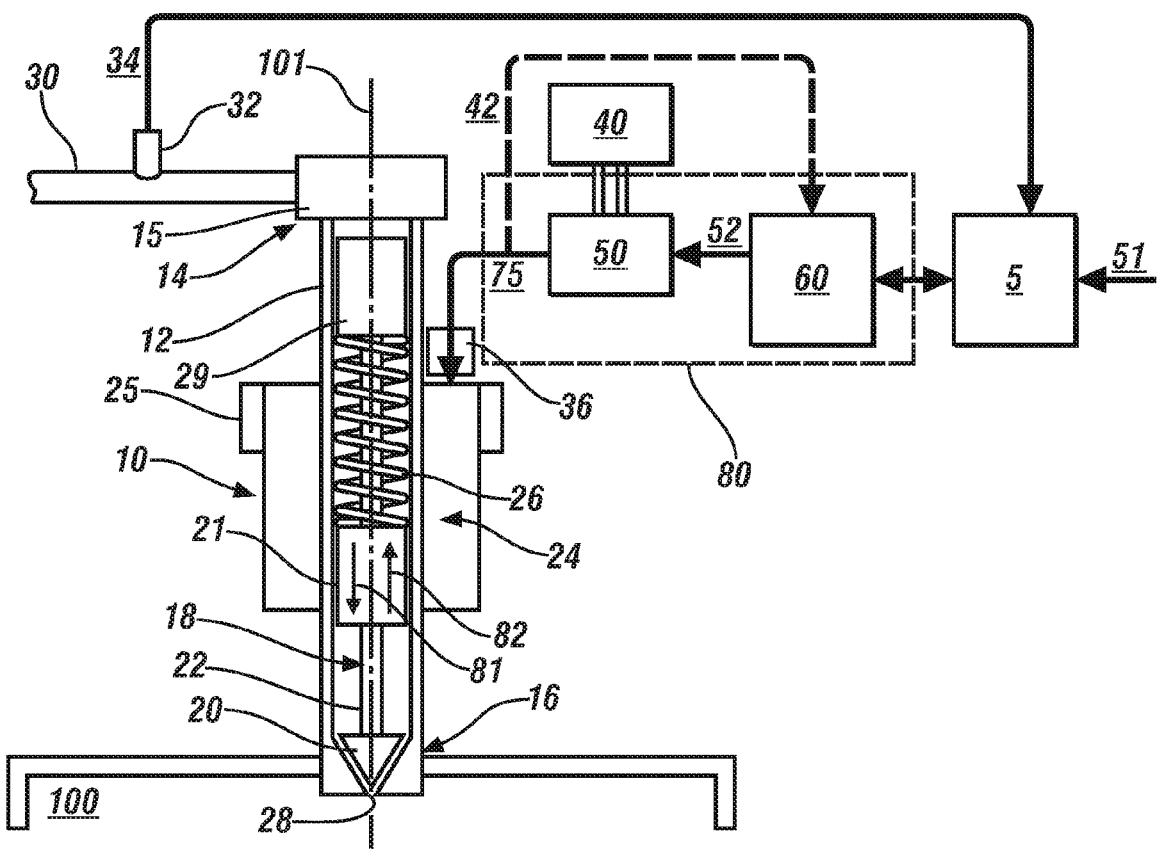
FIG. 1-1 illustrates a schematic sectional view of a fuel injector and an activation controller, in accordance with the present disclosure.

Referring now to the drawings, wherein the showings are for the purpose of illustrating certain exemplary embodiments only and not for the purpose of limiting the same, FIG. 1-1 schematically illustrates a non-limiting exemplary embodiment of an electromagnetically-activated direct-injection fuel injector 10. While an electromagnetically-activated direct-injection fuel injector is depicted in the illustrated embodiment, a port-injection fuel injector is equally applicable. The fuel injector 10 is configured to inject fuel directly into a combustion chamber 100 of an internal combustion engine. An activation controller 80 electrically operatively connects to the fuel injector 10 to control activation thereof. While the illustrated embodiment depicts the activation controller 80 on the outside of the fuel injector 10, embodiments herein are directed toward the activation controller being integrated within, or integral to, a body 12 of the fuel injector 10. The activation controller 80 integrated within the body 12 is shown in detail below in FIG. 4. The activation controller 80 corresponds to only the fuel injector 10. In the illustrated embodiment, the activation controller 80 includes a control module 60 and an injector driver 50. The control module 60 electrically operatively connects to the injector driver 50 that electrically operatively connects to the fuel injector 10 to control activation thereof. The fuel injector 10, control module 60 and injector driver 50 may be any suitable devices that are configured to operate as described herein. In the illustrated embodiment, the control module 60 includes a processing device. An electrical power source 40 and an external control module 5, such as an engine control module (ECM), may electrically operatively couple to the activation controller 80 via one or more cables/wires coupled to terminals of a connection assembly 36 of the fuel injector 10. The terms "cable" and "wire" will be used interchangeably herein to provide transmission of electrical power and/or transmission of electrical signals.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

In general, an armature is controllable to one of an actuated position and a static or rest position. The fuel injector 10 may be any suitable discrete fuel injection device that is controllable to one of an open (actuated) position and a closed (static or rested) position. In one embodiment, the fuel injector 10 includes a cylindrically-shaped hollow body 12 defining a longitudinal axis 101. A fuel inlet 15 is located at a first end 14 of the body 12 and a fuel nozzle 28 is located at a second end 16 of the body 12. The fuel inlet 15 is fluidly coupled to a high-pressure fuel rail 30 that fluidly couples to a high-pressure injection pump. A valve assembly 18 is contained in the body 12, and includes a needle valve 20, a spring-activated pintle 22 and an armature portion 21. The needle valve 20 interferingly seats in the fuel nozzle 28 to control fuel flow therethrough. While the illustrated embodiment depicts a triangularly-shaped needle valve 20, other embodiments may utilize a ball. In one embodiment, the armature portion 21 is fixedly coupled to the pintle 22 and configured to linear translate as a unit with the pintle 22 and the needle valve 20 in first and second directions 81, 82, respectively. In another embodiment, the armature portion 21 may be slidably coupled to the pintle 22. For instance, the armature portion 21 may slide in the first direction 81 until being stopped by a pintle stop fixedly attached to the pintle 22. Likewise, the armature portion 21 may slide in the second direction 82 independent of the pintle 22 until contacting a pintle stop fixedly attached to the pintle 22. Upon contact with the pintle stop fixedly attached to the pintle 22, the force of the armature portion 21 causes the pintle 22 to be urged in the second direction 82 with the armature portion 21. The armature portion 21 may include protuberances to engage with various stops within the fuel injector 10.

An annular electromagnet assembly 24, including an electrical coil and magnetic core, is configured to magnetically engage the armature portion 21 of the valve assembly. The electrical coil and magnetic core assembly 24 is depicted for illustration purposes to be outside of the body of the fuel injector; however, embodiments herein are directed toward the electrical coil and magnetic core assembly 24 to be either integral to, or integrated within, the fuel injector 10. The electrical coil is wound onto the magnetic core, and includes terminals for receiving electrical current from the injector driver 50. Hereinafter, the "electrical coil and magnetic core assembly" will simply be referred to as an "electrical coil 24". When the electrical coil 24 is deactivated and de-energized, the spring 26 urges the valve assembly 18 including the needle valve 20 toward the fuel nozzle 28 in the first direction 81 to close the needle valve 20 and prevent fuel flow therethrough. When the electrical coil 24 is activated and energized, electromagnetic force (herein after "magnetic force") acts on the armature portion 21 to overcome the spring force exerted by the spring 26 and urges the valve assembly 18 in the second direction 82, moving the needle valve 20 away from the fuel nozzle 28 and permitting flow of pressurized fuel within the valve assembly 18 to flow through the fuel nozzle 28. The fuel injector 10 may include a stopper 29 that interacts with the valve assembly 18 to stop translation of the valve assembly 18 when it is urged to open. In one embodiment, a pressure sensor 32 is configured to obtain fuel pressure 34 in the high-pressure fuel rail 30 proximal to the fuel injector 10, preferably upstream of the fuel injector 10. In another embodiment, a pressure sensor 32' may be integrated within the inlet 15 of the fuel injector in lieu of the pressure sensor 32 in the fuel rail 30 or in combination with the pressure sensor. The fuel injector 10 in the illustrated embodiment of FIG. 1-1 is not limited to the spatial and geometric arrangement of the features described herein, and may include additional features and/or other spatial and geometric arrangements known in the art for operating the fuel injector 10 between open and closed positions for controlling the delivery of fuel to the engine 100.

The control module 60 generates an injector command signal 52 that controls the injector driver 50, which activates the fuel injector 10 to the open position for affecting a fuel injection event. In the illustrated embodiment, the control module 60 communicates with one or more external control modules such as the ECM 5. The injector command signal 52 correlates to a desired mass of fuel to be delivered by the fuel injector 10 during the fuel injection event. Similarly, the injector command signal 52 may correlate to a desired fuel flow rate to be delivered by the fuel injector 10 during the fuel injection event. As used herein, the term "desired injected fuel mass" refers to the desired mass of fuel to be delivered to the engine by the fuel injector 10. As used herein, the term "desired fuel flow rate" refers to the rate at which fuel is to be delivered to the engine by the fuel injector 10 for achieving the desired mass of fuel. The desired injected fuel mass can be based upon one or more monitored input parameters 51 input to the control module 60 or ECM 5. The one or more monitored input parameters 51 may include, but are not limited to, an operator torque request, manifold absolute pressure (MAP), engine speed, engine temperature, fuel temperature, and ambient temperature obtained by known methods. The injector driver 50 generates an injector activation signal 75 in response to the injector command signal 52 to activate the fuel injector 10. The injector activation signal 75 controls current flow to the electrical coil 24 to generate electromagnetic force in response to the injector command signal 52. An electric power source 40 provides a source of DC electric power for the injector driver 50. In some embodiments, the DC electric power source provides low voltage, e.g., 12 V, and a boost converter may be utilized to output a high voltage, e.g., 24V to 200 V, that is supplied to the injector driver 50. When activated using the injector activation signal 75, the electromagnetic force generated by the electrical coil 24 urges the armature portion 21 in the second direction 82. When the armature portion 21 is urged in the second direction 82, the valve assembly 18 in consequently caused to urge or translate in the second direction 82 to an open position, allowing pressurized fuel to flow therethrough. The injector driver 50 controls the injector activation signal 75 to the electrical coil 24 by any suitable method, including, e.g., pulsewidth-modulated (PWM) electric power flow. The injector driver 50 is configured to control activation of the fuel injector 10 by generating suitable injector activation signals 75. In embodiments that employ a plurality of successive fuel injection events for a given engine cycle, an injector activation signal 75, that is fixed for each of the fuel injection events within the engine cycle, may be generated.

The injector activation signal 75 is characterized by an injection duration and a current waveform that includes an initial peak pull-in current and a secondary hold current. The initial peak pull-in current is characterized by a steady ramp up to achieve a peak current, which may be selected as described herein. The initial peak pull-in current generates electromagnetic force that acts on the armature portion 21 of the valve assembly 18 to overcome the spring force and urge the valve assembly 18 in the second direction 82 to the open position, initiating flow of pressurized fuel through the fuel nozzle 28. When the initial peak pull-in current is achieved, the injector driver 50 reduces the current in the electrical coil 24 to the secondary hold current. The secondary hold current is characterized by a somewhat steady-state current that is less than the initial peak pull-in current. The secondary hold current is a current level controlled by the injector driver 50 to maintain the valve assembly 18 in the open position to continue the flow of pressurized fuel through the fuel nozzle 28. The secondary hold current is preferably indicated by a minimum current level. In some embodiments, the injector driver 50 is configured as a bi-directional current driver capable of providing a negative current flow through the electrical coil 24. As used herein, the term "negative current flow" refers to the direction of the current flow for energizing the electrical coil to be reversed. Accordingly, the terms "negative current flow" and "reverse current flow" are used interchangeably herein. In embodiments when the injector driver 50 is configured as the bi-directional current driver, the injector activation signal 75 may be additionally characterized by the negative current flow through the electrical coil 24.

Embodiments herein are directed toward controlling the fuel injector for a plurality of fuel injection events that are closely-spaced during an engine cycle. As used herein, the term "closely-spaced" refers to a dwell time between each consecutive fuel injection event being less than a predetermined dwell time threshold. As used herein, the term "dwell time" refers to a period of time between an end of injection for the first fuel injection event (actuator event) and a start of injection for a corresponding second fuel injection event (actuator event) of each consecutive pair of fuel injection events. The dwell time threshold can be selected to define a period of time such that dwell times less than the dwell time threshold are indicative of producing instability and/or deviations in the magnitude of injected fuel mass delivered for each of the fuel injection events. The instability and/or deviations in the magnitude of injected fuel mass may be responsive to a presence of secondary magnetic effects. The secondary magnetic effects include persistent Eddy Currents and magnetic hysteresis within the fuel injector and a residual flux based thereon. The persistent Eddy Currents and magnetic hysteresis are present due to transitions in initial flux values between the closely-spaced fuel injection events. Accordingly, the dwell time threshold is not defined by any fixed value, and selection thereof may be based upon, but not limited to, fuel temperature, fuel injector temperature, fuel injector type, fuel pressure and fuel properties such as fuel types and fuel blends. As used herein, the term "flux" refers to magnetic flux indicating the total magnetic field generated by the electrical coil 24 and passing through the armature portion. Since the electrical coil 24 is energized by a current through its inductance, the magnetic flux can be derived from the flux linkage which is equal to the product of the coil inductance and current flowing therethrough. Since the turns of the electrical coil 24 link the magnetic flux in the magnetic core, this flux can therefore be equated from the flux linkage. The flux linkage is also based upon the flux density passing through the armature portion, the surface area of the armature portion adjacent to the air gap and the number of turns of the coil 24. Accordingly, the terms "flux", "magnetic flux" and "flux linkage" will be used interchangeably herein unless otherwise stated.

For fuel injection events that are not closely spaced, a fixed current waveform independent of dwell time may be utilized for each fuel injection event because the first fuel injection event of a consecutive pair has little influence on the delivered injected fuel mass of the second fuel injection event of the consecutive pair. However, the first fuel injection event may be prone to influence the delivered injected fuel mass of the second fuel injection event, and/or further subsequent fuel injection events, when the first and second fuel injection events are closely-spaced and a fixed current wave form is utilized. Any time a fuel injection event is influenced by one or more preceding fuel injection events of an engine cycle, the respective delivered injected fuel mass of the corresponding fuel injection event can result in an unacceptable repeatability over the course of a plurality of engine cycles and the consecutive fuel injection events are considered closely-spaced. More generally, any consecutive actuator events wherein residual flux from the preceding actuator event affects performance of the subsequent actuator event relative to a standard, for example relative to performance in the absence of residual flux, are considered closely-spaced.

Figures 1, 2:
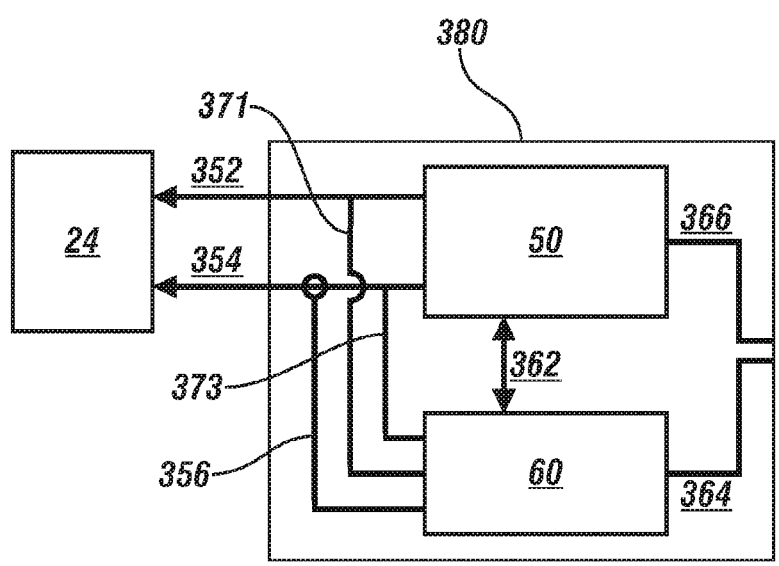

FIG. 2 illustrates a non-limiting exemplary first plot 1000 of measured current and fuel flow rate and a non-limiting exemplary second plot 1010 of measured main excitation coil and search coil voltages for two successive fuel injection events having identical current pulses that are separated by a dwell time that is not indicative of being closely spaced. Dashed vertical line 1001 extending through each of plots 1000 and 1010 represents a first time whereat an end of injection for the first fuel injection event occurs and dashed vertical line 1002 represents a second time whereat a start of injection for the second fuel injection event occurs. The dwell time 1003 represents a period of time between dashed vertical lines 1001 and 1002 separating the first and second fuel injection events. In the illustrated embodiment, the dwell time exceeds a dwell time threshold. Thus, the first and second fuel injection events are not indicative of being closely-spaced.

Referring to the first plot 1000, measured current and flow rate profiles 1011, 1012, respectively, are illustrated for the two fuel injection events. The vertical y-axis along the left side of plot 1000 denotes electrical current in Amperage (A) and the vertical y-axis along the right side of plot 1000 denotes fuel flow rate in milligrams (mg) per milliseconds (ms). The measured current profile 1011 is substantially identical for each of the fuel injection events. Likewise, the measured fuel flow rate profile 1012 is substantially identical for each of the fuel injection events due to the fuel injection events not indicative of being closely-spaced.

Referring to the second plot 1010, measured main excitation coil and search coil voltage profiles 1013, 1014, respectively, are illustrated for the two fuel injection events. The measured main coil voltage may represent a measured voltage of the electromagnetic coil 24 of FIG. 1-1 and the measured search coil voltage may represent a measured voltage of a search coil 25 mutually magnetically coupled to the electrical coil 24 of FIG. 1-1. The vertical y-axis of plot 1010 denotes voltage (V). Accordingly, when the main excitation coil is energized, magnetic flux generated by the main excitation coil may be linked to the search coil due to the mutual magnetic coupling. The measured search coil voltage profile 1014 indicates the voltage induced in the search coil which is proportional to the rate of change of the mutual flux-linkage. The measured main excitation coil and search coil voltage profiles 1013, 1014, respectively, of plot 1010 are substantially identical for each of the first and second fuel injection events that are not indicative of being closely-spaced.

Figures 1, 2, 3:
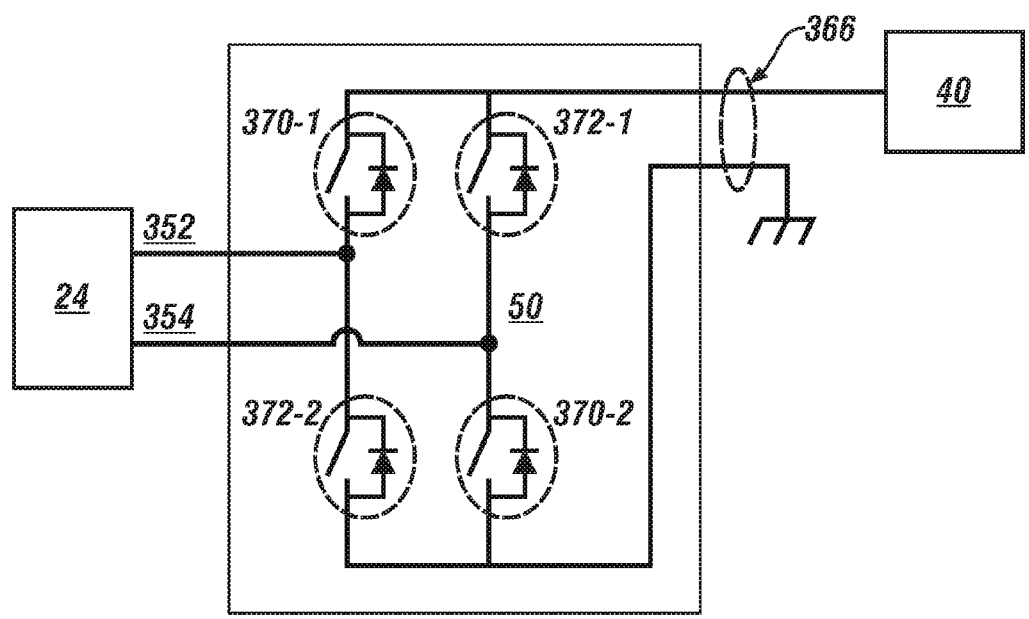
Figure 2:
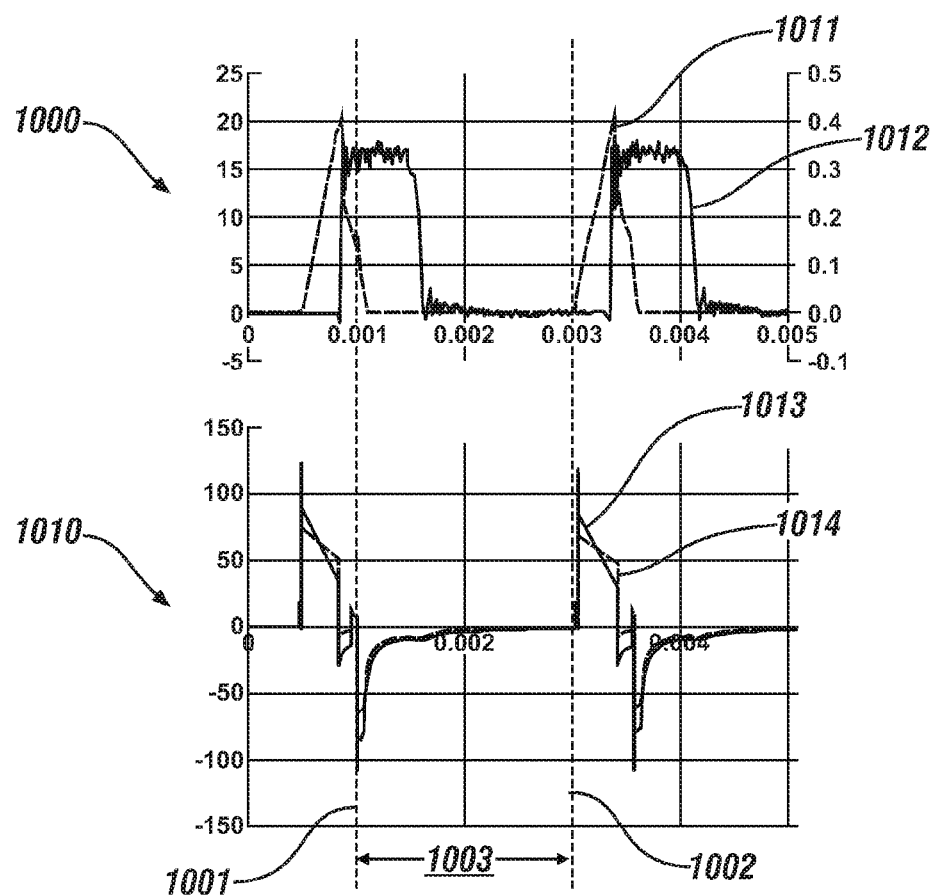
Figure 3:
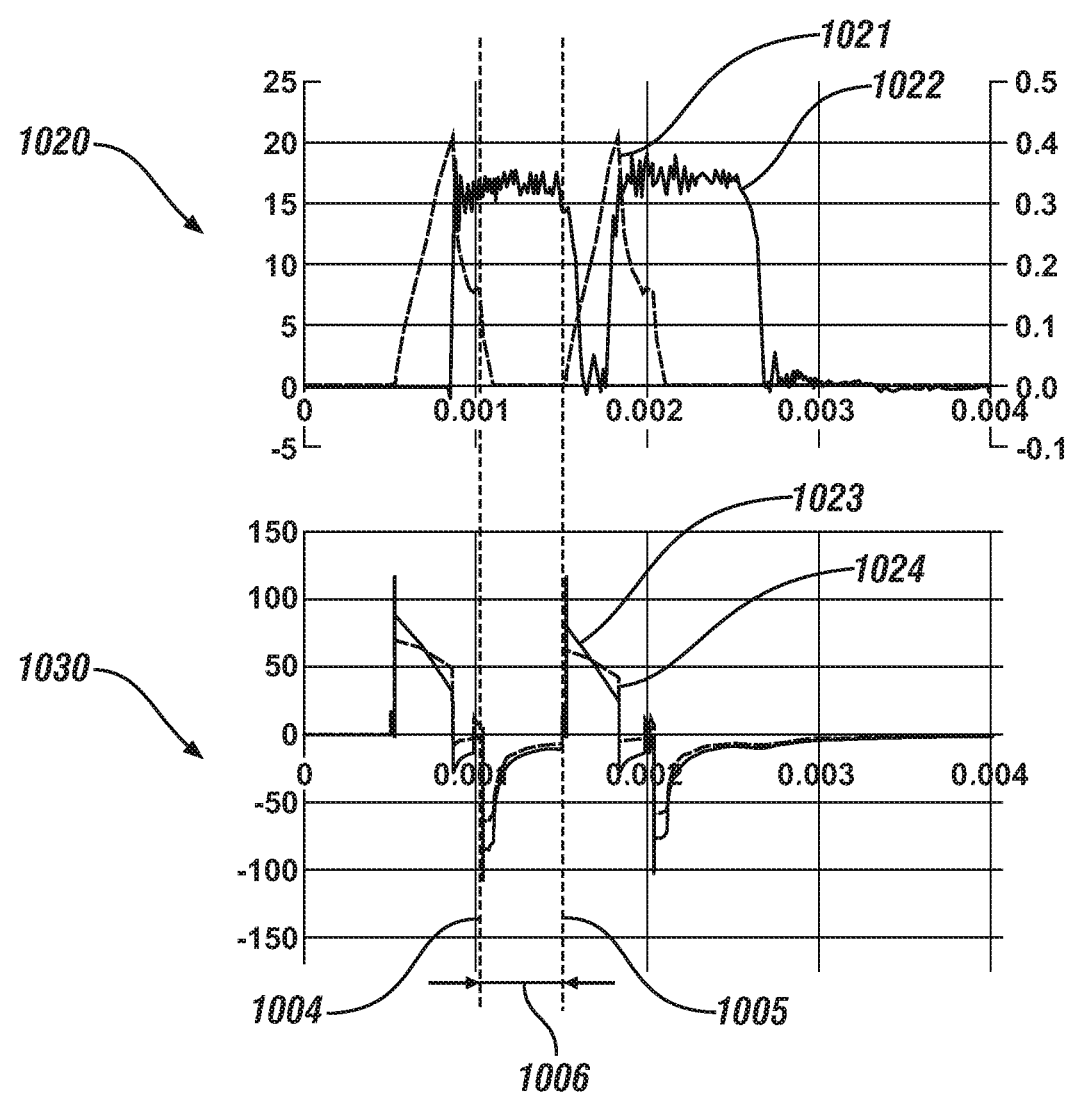

FIG. 3 illustrates a non-limiting exemplary first plot 1020 of measured current and fuel flow rate and a non-limiting exemplary second plot 1030 of measured main excitation coil and search coil voltages for two successive fuel injection events having identical current pulses that are separated by a dwell time that is indicative of being closely spaced. The horizontal x-axis in each of plots 1020 and 1030 denotes time in seconds (s). Dashed vertical line 1004 extending through each of plots 1020 and 1030 represents a first time whereat an end of injection for the first fuel injection event occurs and dashed vertical line 1005 represents a second time whereat a start of injection for the second fuel injection event occurs. The dwell time 1006 represents a period of time between dashed vertical lines 1004 and 1005 separating the first and second fuel injection events. In the illustrated embodiment, the dwell time is less than a dwell time threshold. Thus, the first and second fuel injection events are indicative of being closely-spaced.

Referring to the first plot 1020, measured current and flow rate profiles 1021, 1022, respectively, are illustrated for the two fuel injection events. The vertical y-axis along the left side of plot 1020 denotes electrical current in Amperage (A) and the vertical y-axis along the right side of plot 1020 denotes fuel flow rate in milligrams (mg) per millisecond (ms). The measured current profile 1021 is substantially identical for each of the fuel injection events. However, the measured flow rate profile 1022 illustrates a variation in the measured fuel flow rate between each of the first and second fuel injection events even though the measured current profiles are substantially identical. This variance in the measured fuel flow rate is inherent in closely-spaced fuel injection events and undesirably results in an injected fuel mass delivered at the second fuel injection event that is different than an injected fuel mass delivered at the first fuel injection event.

Referring to the second plot 1030, measured main excitation coil and search coil voltage profiles 1023, 1024, respectively, are illustrated for the two fuel injection events. The measured main coil voltage may represent a measured voltage of the electrical coil 24 of FIG. 1-1 and the measured search coil voltage may represent a measured voltage of a search coil 25 mutually magnetically coupled to the electrical coil 24 of FIG. 1-1. The vertical y-axis of plot 1030 denotes voltage (V). Accordingly, when the main excitation coil is energized, magnetic flux generated by the main excitation coil may be linked to the search coil due to the mutual magnetic coupling. The measured search coil voltage profile 1024 indicates the voltage induced in the search coil which is proportional to the rate of change of the mutual flux-linkage. The measured main excitation coil and search coil voltage profiles 1023, 1024, respectively, of plot 1030 deviate during the second injection event in comparison to the first fuel injection event. This deviation is indicative of the presence of residual flux or magnetic flux when the injection events are closely-spaced. Referring to plot 1010 of FIG. 2 the measured main excitation coil and search coil voltage profiles 1013, 1014, respectively do not deviate during the second injection event in comparison to the first fuel injection event when the first and second fuel injection events are not closely-spaced.

Referring back to FIG. 1-1, exemplary embodiments are further directed toward providing feedback signal(s) 42 from the fuel injector 10 back to the control module 60 and/or the injector driver 50. Discussed in greater detail below, sensor devices may be integrated within the fuel injector 10 for measuring various fuel injector parameters including, but not limited to, fuel pressure, coil resistance, coil temperature, magnetic flux within the fuel injector 10, the flux linkage of the electrical coil 24, voltage of the electrical coil 24 and current through the electrical coil 24. Integrating the activation controller within the body 12 of the fuel injector 10 advantageously allows the feedback signal(s) 42 to be transmitted to the control module 60 quickly. Moreover, due to the close proximity of the control module 60, the feedback signal(s) 42 encounters less disturbances allowing for more accurate readings of the parameters contained therein. A current sensor may be provided on a current flow path between the activation controller 80 and the fuel injector to measure the current provided to the electrical coil or the current sensor can be integrated within the fuel injector 10 on the current flow path. The pressure sensor 32' is integrated within the inlet 15 of the fuel injector 10. The fuel injector parameters provided via feedback signal(s) 42 may include the magnetic flux, flux linkage, voltage and current directly measured by corresponding sensor devices integrated within the fuel injector 10. Additionally or alternatively, the fuel injector parameters may include proxies provided via feedback signal(s) 42 to—and used by—the control module 60 to estimate the flux linkage, magnetic flux, the voltage, and the current within the fuel injector 10. The control module 60 may utilize a look-up table to convert indirect sensor readings into estimated fuel injector parameters. Having feedback of the flux linkage of the electrical coil 24, the voltage of the electrical coil 24 and current provided to the electrical coil 24, the control module 60 may advantageously modify the activation signal 75 to the fuel injector 10 for multiple consecutive injection events. The feedback signal(s) 42 can additionally relay information regarding the actual opening and closing times of the fuel injector. Since the activation controller 80 is integrated within the body 12 of the fuel injector 10, the control module may monitor commanded opening and closing times of the fuel injector and receive feedback of actual opening and closing times. Thereafter, the control module 60 can modify the injector command signal 52 to the injector driver 50 to reduce delays between the commanded and actual opening and closing times. It will be understood that conventional fuel injectors are controlled by open loop operation based solely upon a desired current waveform obtained from look-up tables or analytical functions without any information related to the force producing component of the flux linkage (e.g., magnetic flux) affecting movement of the armature portion 21. As a result, conventional feed-forward fuel injectors that only account for current flow for controlling the fuel injector, are prone to instability in consecutive fuel injection events that are closely-spaced.

Embodiments herein are not concerned with any one technique for obtaining the active magnetic flux or the equivalent flux linkage. In some embodiments, a search coil 25 may be utilized around the electrical coil, wherein magnetic flux created by the electrical coil links the search coil due to mutual magnetic coupling. Voltage induced in the search coil is proportional to the rate of change of the coil flux linkage based on the following relationship.

$$V_{SC} = \frac{d\lambda}{dt} \text{ or } \lambda = \int V_{SC} dt \quad [1]$$

wherein $V_{SC}$ is the voltage induced by the search coil 25,
$\lambda$ is the flux-linkage in the search coil 25, and
t is time.

The flux linkage in the search coil 25 can be utilized to determine the magnetic flux within the fuel injector based on the following relationship.

$$\varphi = \frac{\lambda}{N} \quad [2]$$

wherein $\varphi$ is the magnetic flux within the fuel injector, and N is the number of turns in the search coil 25.

Accordingly, the voltage of the search coil 25 can be provided via feedback signal(s) 42 to the control module 60 for estimating the flux linkage. Thus, a voltage sensor for measuring the voltage of the search coil and the search coil itself are indicative of sensing devices integrated within the fuel injector 10 for obtaining the flux linkage. In other embodiments, a magnetic field sensor such as a Hall sensor may positioned within a magnetic flux path within the fuel injector for measuring the active magnetic flux. Similarly, other magnetic field sensors can be utilized to measure the active magnetic flux such as, but not limited to, analog Hall sensors and Magnetoresistive (MR) type sensors. The active magnetic flux measured by such magnetic field sensors can be provided via feedback signal(s) 42 to the control module 60. It is understood that these magnetic field sensors are indicative of sensing devices integrated within the fuel injector for obtaining the active magnetic flux. Integration of the search coil and magnetic field sensors within the fuel injector will be described in greater detail in FIGS. 5 and 6 below.

It is known when the injector driver 50 only provides current unidirectionally in a positive first direction to energize the electromagnetic coil and core assembly 24, releasing the current to remain stable at zero will result in the magnetic flux within the fuel injector to gradually decay, e.g., taper off, towards zero. However, the response time for the magnetic flux to decay is slow, and the presence of magnetic hysteresis within the fuel injector often results in the presence of residual flux when a subsequent consecutive fuel injection event is initiated. As aforementioned, the presence of the residual flux impacts the accuracy of the fuel flow rate and injected fuel mass to be delivered in the subsequent fuel injection event, wherein the presence of the residual flux is enhanced for closely spaced fuel injection events.

FIG. 1-2 illustrates the activation controller 80 of FIG. 1-1. Signal flow path 362 provides communication between the control module 60 and the injector driver 50. For instance, signal flow path 362 provides the injector command signal (e.g., command signal 52 of FIG. 1-1) that controls the injector driver 50. The control module 60 further communicates with the external ECM 5 via signal flow path 364 within the activation controller 380 that is in electrical communication with a power transmission cable. For instance, signal flow path 364 may provide monitored input parameters (e.g., monitored input parameters 51 of FIG. 1-1) from the ECM 5 to the control module 60 for generating the injector command signal 52. In some embodiments, the signal flow path 364 may provide feedback fuel injector parameters (e.g., feedback signal(s) 42 of FIG. 1-1) to the ECM 5.

The injector driver 50 receives DC electric power from the power source 40 of FIG. 1-1 via a power supply flow path 366. Using the received DC electric power, the injector driver 50 may generate injector activation signals (e.g., injector activation signals 75 of FIG. 1-1) based on the injector command signal from the control module 60.

The injector driver 50 is configured to control activation of the fuel injector 10 by generating suitable injector activation signals 75. In the illustrated embodiment, the injector driver 50 is a bi-directional current driver providing positive current flow via a first current flow path 352 and negative current flow via a second current flow path 354 to the electromagnetic coil and core assembly 24 in response to respective injector activation signals 75. The positive current via the first current flow path 352 is provided to energize an electromagnetic coil and core assembly 24 and the negative current via the second current flow path 354 reverses current flow through the electromagnetic coil and core assembly 24. Current flow paths 352 and 354 form a closed loop; that is, a positive current into 352 results in an equal and opposite (negative) current in flow path 354, and vice versa. The direction of current flow of the first and a second current flow paths 352, 354, respectively, can be alternated to reset residual flux within the fuel injector and control bounce of the armature portion 21. Signal flow path 371 can provide a voltage of the first current flow path 352 to the control module 60 and signal flow path 373 can provide a voltage of the second current flow path 354 to the control module 60. The voltage and current applied to the electromagnetic coil and core assembly 24 is based on a difference between the voltages at the signal flow paths 371 and 373. In one embodiment, the injector driver 50 utilizes open loop operation to control activation of the fuel injector 10, wherein the injector activation signals are characterized by precise predetermined current waveforms. In another embodiment, the injector driver 50 utilizes closed loop operation to control activation of the fuel injector 10, wherein the injector activation signals are based upon fuel injector parameters provided as feedback to the control module, via the signal flow paths 371 and 373. A measured current flow to the coil 24 can be provided to the control module 60, via signal flow path 356. In the illustrated embodiment, the current flow is measured by a current sensor on the second current flow path 354. The fuel injector parameters may include flux linkage, voltage and current values within the fuel injector 10 or the fuel injector parameters may include proxies used by the control module 60 to estimate flux linkage, voltage and current within the fuel injector 10.

In some embodiments, the injector driver 50 is configured for full four quadrant operation. FIG. 1-3 illustrates an exemplary embodiment of the injector driver 50 of FIGS. 1-1 and 1-2 utilizing two switch sets 370 and 372 to control the current flow provided between the injector driver 50 and the electromagnetic coil and core assembly 24. In the illustrated embodiment, the first switch set 370 includes switch devices 370-1 and 370-2 and the second switch set 372 includes switch devices 372-1 and 372-2. The switch devices 370-1, 370-2, 372-1, 372-2 can be solid state switches and may include Silicon (Si) or wide band gap (WBG) semiconductor switches enabling high speed switching at high temperatures. The four quadrant operation of the injector driver 50 controls the direction of current flow into and out of the electromagnetic coil and core assembly 24 based upon a corresponding switch state determined by the control module 60. The control module 60 may determine a positive switch state, a negative switch state and a zero switch state and command the first and second switch sets 370 and 372 between open and closed positions based on the determined switch state. In the positive switch state, the switch devices 370-1 and 370-2 of the first switch set 370 are commanded to the closed position and the switch devices 372-1 and 372-2 of the second switch set 372 are commanded to the open position to control positive current into the first current flow path 352 and out of the second current flow path 354. These switch devices may be further modulated using pulse width modulation to control the amplitude of the current. In the negative switch state, the switch devices 370-1 and 370-2 of the first switch set 370 are commanded to the open position and the switch devices 372-1 and 372-2 of the second switch set 372 are commanded to the closed position to control negative current into the second current flow path 354 and out of the first current flow path 352. These switch devices may be further modulated using pulse width modulation to control the amplitude of the current. In the zero switch state, all the switch devices 370-1, 370-2, 372-1, 372-2 are commanded to the open position to control no current into or out of the electromagnetic coil and core assembly or allow the coil current to decrease with the natural time constant of the coil through the appropriate freewheeling diodes across the switches. Thus, bi-directional control of current through the coil 24 may be effected.

In some embodiments, the negative current through the electromagnetic coil and core assembly 24 is applied for a sufficient duration for reducing residual flux within the fuel injector 10 after a secondary hold current is released. In other embodiments, the negative current is applied subsequent to release of the secondary hold current but additionally only after the fuel injector has closed or actuator has returned to its static or rest position. Moreover, additional embodiments can include the switch sets 370 and 372 to be alternately switched between open and closed positions to alternate the direction of the current flow to the coil 24, including pulse width modulation control to effect current flow profiles. The utilization of two switch sets 370 and 372 allows for precise control of current flow direction and amplitude applied to the current flow paths 352 and 354 of the electromagnetic coil and core assembly 24 for multiple consecutive fuel injection events during an engine event by reducing the presence of eddy currents and magnetic hysteresis within the electromagnetic coil and core assembly 24.

It will be appreciated that the activation controller 80 corresponds to only one fuel injector. Therefore, engines employing more than one fuel injector will each include a respective activation controller 80 integrated therein. The ECM 5 and the power source 50 are electrically operatively coupled to each of the activation controllers. Accordingly, each fuel injector can be operated on an individual basis using feedback parameters respective to each fuel injector and operation of the fuel injectors can be modified on an individual basis in response to the feedback parameters. Accordingly, the respective activation controller 80 integrated within the body 12 of the fuel injector is capable of "plug & play" operation for controlling the respective fuel injector 10 on an individual basis.

Figure 4:
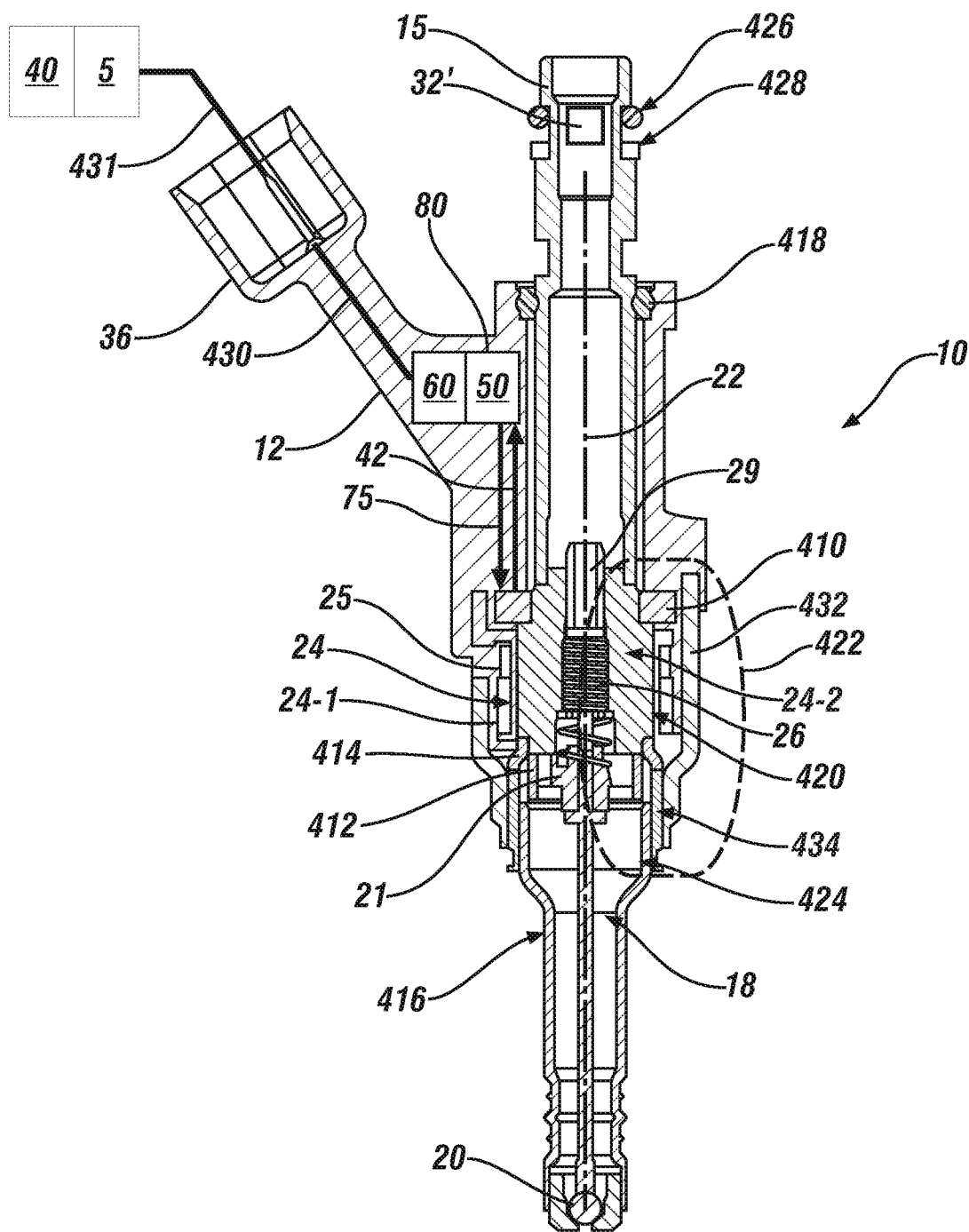
FIG. 4 illustrates a schematic detailed sectional view of the fuel injector of FIG. 1-1 including the activation controller integrated within the fuel injector, in accordance with the present disclosure.

FIG. 4 illustrates a non-limiting exemplary embodiment of a schematic detailed sectional view of the fuel injector 10 of FIG. 1-1 including the activation controller 80 integrated within the fuel injector. FIG. 4 will be described with reference to FIG. 1-1, wherein like numerals indicate like features. In the illustrated embodiment of FIG. 4, an upper body portion 420 of the fuel injector includes the electromagnetic assembly 24 comprising the electrical coil 24-1 and the magnetic core 24-2, a guide ring 412 enclosing the armature portion 21, a spacer 414 provided to prevent contact between the electromagnetic assembly 24, a flux connector 410 including terminals electrically operatively coupled to the electrical and search coils 24-1, 25, respectively, actuator housing 432, collar 434 coupling the upper body portion 420 to the lower body portion 424, magnetic field sensor(s) within area 422 and the activation controller 80 integrated within the body 12 of the fuel injector 10. An upper housing seat and cartridge assembly 416 separates the upper body portion 420 from a lower body portion 424 which includes the nozzle 20 and a fuel chamber. The actuator housing 432 is a cylindrous housing enclosing the electromagnetic core.

Within the inlet 15 of the fuel injector 10, the pressure sensor 32' is provided to obtain fuel pressure 34 entering the inlet 15 from the fuel rail 30. The fuel pressure 34 may be provided directly to the control module 60 of the activation controller 80, or the fuel pressure 34 may be provided to the flux connector 410 and provided within feedback signal(s) 42 to the activation controller 80. An o-ring-426 and a back-up ring 428 are provided proximate to the inlet 15 for sealing purposes.

In the illustrated embodiment, the activation controller 80 is integrated within the body 12 of the fuel injector. The activation controller 80 is electrically operatively coupled to the external ECM 5 and the external power source 40 via cables 430 and 431 connected to a terminal of the connector assembly 36. The terminal may include a multi-pin connector in some embodiments. The ECM 5 may transmit command signals, such as a desired injected fuel mass to be delivered to the combustion chamber, to the control module 60 of the activation controller 80. The power source 40 may provide electrical power to the injector driver 50 of the activation controller 80 for energizing the electrical coil 24-1. Moreover, the control module 60 may communicate operating parameters of the fuel injector 10, such as status and output feedback signals, to the external ECM 5.

One or more cables or wires may be integrated within the body of the fuel injector 10 such that the injector driver 50 can provide the injector activation signal 75 including injector duration and current waveforms e.g., bi-directional or unidirectional currents, to the flux connector 410 for energizing the electrical coil 24-1 during activation events of the fuel injector. In some embodiments, the injector driver 50 may include onboard power supply drivers enabling variable voltage and current of suitable duration, magnitude and polarity to the actuator to be generated.

Moreover, the feedback signal(s) 42, including one or more parameters of the fuel injector 10, can be provided from the flux connector 410 to the control module 60 of the activation controller 80. In contrast to conventional fuel injectors controlled only by external components, the integrated activation controller 80 allows for closed loop operation based upon feedback parameters of the fuel injector and commands from the external ECM 5. The closed loop operation allows the activation controller 80 integrated within the fuel injector to quickly adapt to the operation of the fuel injector and modify the injector activation signal 75 based thereon such that actual durations for fuel injection events closely match commanded durations and actual delivered injected fuel masses closely match commanded injected fuel masses to be delivered. Thus, the feedback signal(s) 42 may include the actual opening and closing times of the fuel injector 10, or the feedback signal(s) 42 may include one or more of the aforementioned parameters to be used by the control module 60 for obtaining the actual opening and closing times.

As aforementioned, the control module 60 includes a processing device. The processing device may receive a valve opening command and provide injector identification, status and output feedback to the injector driver 50 and/or the external ECM 5. The processing device may process the feedback signal(s) 42 from sensor devices integrated within the fuel injector and generate necessary outputs, e.g., injector command signal 52, to the injector driver 50. The control module 60 may further include one or more memory devices to store program and data information that can be retrieved by the processing device to execute algorithms and routines to detect the valve/nozzle opening times and adjust the injector activation signal 75 recursively to match the commanded valve/nozzle opening time. Accordingly, the activation controller 80 integrated within the fuel injector may include one or more application-specific integrated circuit(s) (ASIC) to execute sensing, processing, communication and injector driver elements.

As aforementioned, feedback signal(s) 42 can directly include parameters such fuel rail pressure 34 from the pressure sensor 32', electrical current provided to the electrical coil 24-1 and voltages induced by the search and/or electrical coil 25, 24-1, respectively. Feedback signal(s) 42 can further include parameters used by the control module 60 to estimate magnetic flux, flux linkage, electromagnetic force and displacement of the valve assembly 18. Feedback signal can include other fuel injector parameters including parameters obtained from, but are not limited to, microelectromechanical systems (MEMS) sensors, Hall effect sensors, giant magnetoresistance (GMR) sensors, piezoelectric sensors, and conductivity based sensors. For instance, parameters provided via the feedback signal(s) 42 can be utilized by the control module 60 to obtain differences in resistances between the upper and lower body portions 420, 424, respectively to detect actual opening and closing of the valve.

The activation controller 80 may further be adjusted for aging of the fuel injector 10. For instance, the processing device of the control module 60 may be programmed to receive an initial or nominal set for specific parameters that will enable the injector to rapidly adapt to adjust the desired injected fuel mass commanded from the ECM 5 to achieve necessary performance accuracy. The activation controller 80 may further diagnose faults within the injector based on variations of critical parameters such as opening and closing delays and actuator component (e.g., spring 26, electrical coil 24-1, magnetic) degradation, and make remedial measures based on a diagnosis. Additionally, the integrated activation controller 80 and fuel injector 10 can be initially trained by supplying initial predetermined test signals to the controller 80 and injector 10 for a predetermined period of time to enable the controller 80 to learn required parameters such that opening and closing delays and the electrical current and voltage waveforms match those that are commanded. It will be understood that conventional fuel injectors do not monitor opening and closing delays on an individual basis or modify operation when undesired delays occur.

Figure 5:
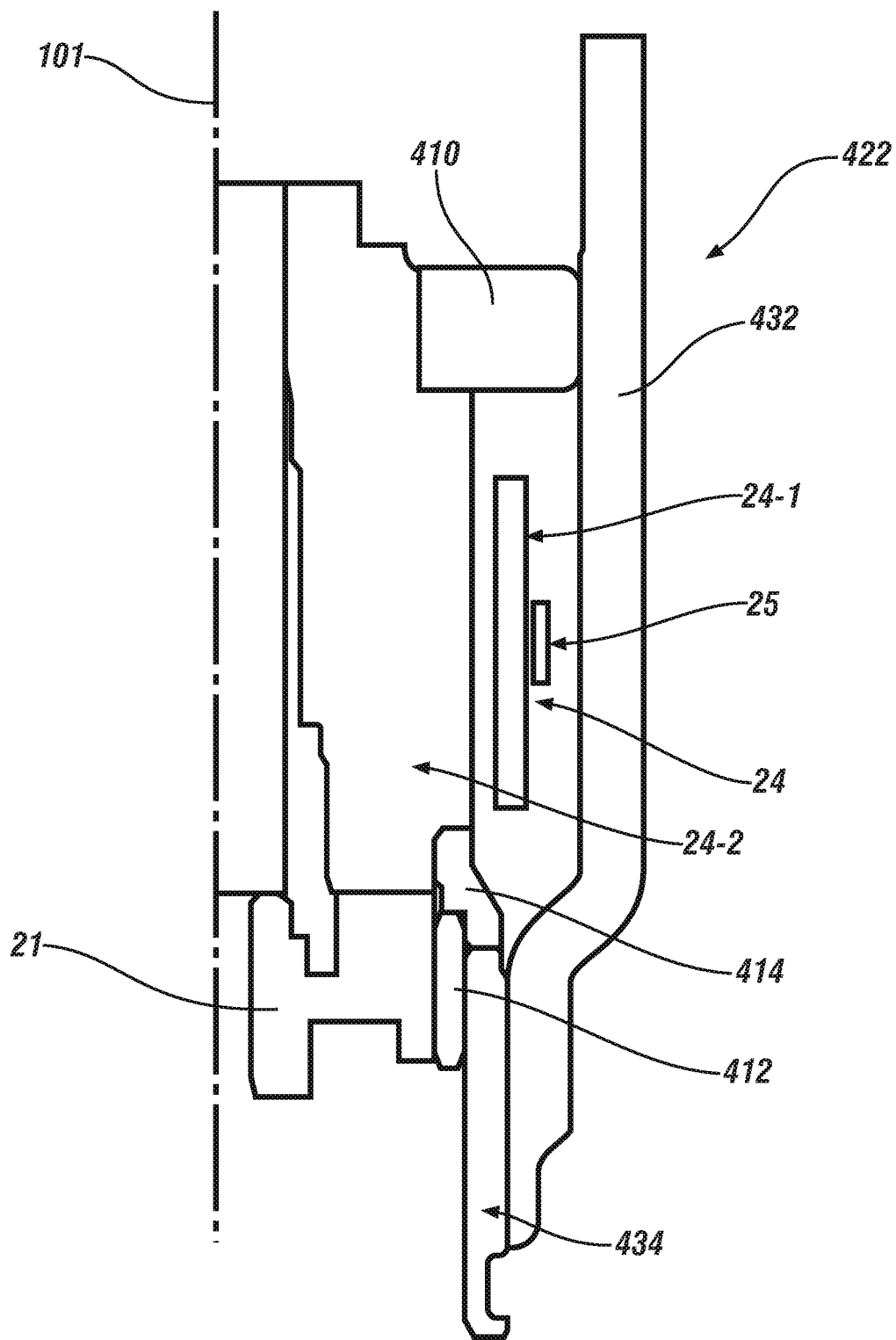
FIG. 5 illustrates a schematic sectional detailed view of a search coil mutually magnetically coupled to an electrical coil within area 422 of FIG. 4, in accordance with the present disclosure.

FIG. 5 illustrates a non-limiting exemplary embodiment of a schematic sectional detailed view of the fuel injector 10 within area 422 of FIG. 4 including the search coil 25 mutually magnetically coupled to the electrical coil 24-1 which is wrapped around the magnetic core 24-2. The longitudinal axis 101 indicates an axis of symmetry for the fuel injector 10. The armature portion 21, guide ring 412, spacer 414, electromagnetic assembly 24, actuator housing 432, and collar 434 are depicted in the illustrated embodiment of FIG. 5 within area 422 of the fuel injector 10.

The search coil 25 (e.g., FIG. 1-1) enables active magnetic flux within the fuel injector to be obtained indirectly. In the illustrated embodiment, the search coil 25 is wound around the electrical coil 24-1. For instance, the search coil 25 may be wound onto the magnetic core 24-2 adjacent to, or around, the electrical coil 24-1 such that the search coil 25 is within a magnetic flux path generated by the electrical coil 24-1 when energized by electrical current. In an exemplary embodiment the search coil may be configured such that it is radially adjacent to the electrical coil 24-1 or may alternatively be configured such that is axially adjacent to the electric coil 24-1. The search coil 25 may include a smaller or equal wire size to that of the electrical coil. The terminal leads of the search coil 25 may be brought along the terminal leads of the electrical coil 24-1 and connected at the flux connector 410 for providing interface (e.g., feedback signal(s) 42) to the activation controller 80. A voltage sensor may be located along the leads of the search coil 25 or within the flux connector 410.

As aforementioned, the search coil 25 and the electrical coil 24-1 are mutually magnetically coupled, wherein a voltage induced by the search coil 25 can be utilized to obtain a flux-linkage of the search coil 25, as described above utilizing Equation [1]. The mutual magnetic coupling between the electrical and search coils includes a mutual coupling indicative of being tight, e.g., a mutual coupling equal to 0.99. Under this scenario, the flux-linkage for the search coil 25 using Equation [1] is substantially identical to the flux-linkage for the main coil. The magnetic flux can be obtained utilizing Equation [2] based on the flux-linkage of the search coil 25 and the number turns of the search coil 25. Accordingly, resistance drops associated with measuring a voltage across the electrical coil 24-1 to obtain flux-linkage do not have to be accounted for. The control module 60 can receive the voltage induced in the search coil 25 and execute Equations [1] and [2] to obtain the magnetic flux within the fuel injector. The control module 60 may store data such as the prescribed number of turns for the electrical and search coils 24-1, 25, respectively.

Moreover, the search coil 25 can include a prescribed number of turns chosen such that the induced search coil voltage is within a predetermined range for ease of measurement. For instance, the number of turns in the search coil can be chosen so a turns-ratio between the main coil and the search coil is around 10. Based upon the voltage induced by the search coil 25, the voltage induced in the electrical coil 24-1 can be expressed as follows.

$$V_{MI} = k \times V_{SC} = k \times \frac{d\lambda}{dt} \quad [3]$$

wherein $V_{MI}$ is the voltage induced in the electrical coil 24-1.

k is the turns-ratio of the number of turns of the electrical coil 24-1 to the number of turns of the search coil 25, and t is time.

The control module 60 can receive the voltage induced in the search coil 25 and execute Equations [1] and [2] to obtain the magnetic flux within the fuel injector. Using the voltage induced in the electrical coil obtained from Equation [3], resistance of the electrical coil 24-1 can be expressed as follows based on the measured main coil voltage $V_{MC}$.

$$R = \left(\frac{V_{MC} - k * V_{SC}}{i}\right) \quad [4]$$

wherein $V_{MC}$ is the measured voltage of the electrical coil 24-1,

R is the resistance of the electrical coil 24-1, i is the measured current through the electrical coil 24-1.

The magnetic flux path generated by the electrical coil 24-1 when energized by electrical current is preferably a high permeability and low reluctance flux path. In the exemplary embodiment of FIG. 5 the magnetic flux path is made up of the magnetic circuit including magnetic core 24-2, armature 21 and additional flux return structure which comprises flux return path components including flux connector 410, actuator housing 432, collar 434, and guide ring 412. Any flux return structure components preferably interface in immediate adjacency to minimize air gaps which increase overall magnetic circuit reluctance. The flux return structure is preferably comprised of components having a high magnetic permeability. In this embodiment the magnetic core 24-2 and flux connector 410 interface in immediate adjacency. Flux connector 410 is immediately adjacent to actuator housing 432, which is immediately adjacent to collar 434. Collar 434 is immediately adjacent to guide ring 412 which is immediately adjacent to armature 21. Armature 21 is immediately adjacent to the magnetic core 24-1 thus completing the magnetic circuit providing a magnetic flux path with a low reluctance. Collar 434 may be made of a magnetizable steel to guide magnetic flux along the magnetic flux path to the armature.

Figures 1, 6:
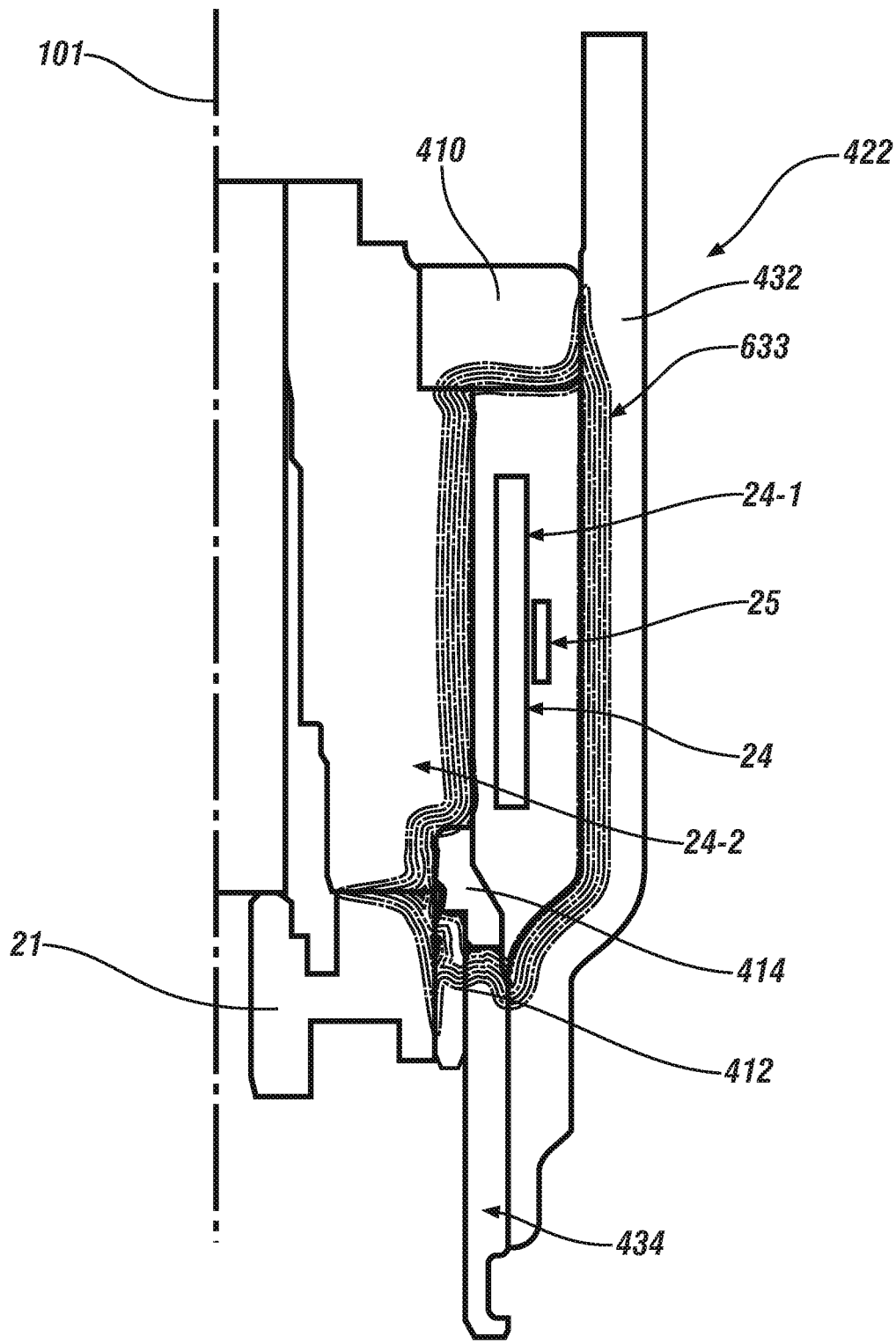
Figures 2, 6:
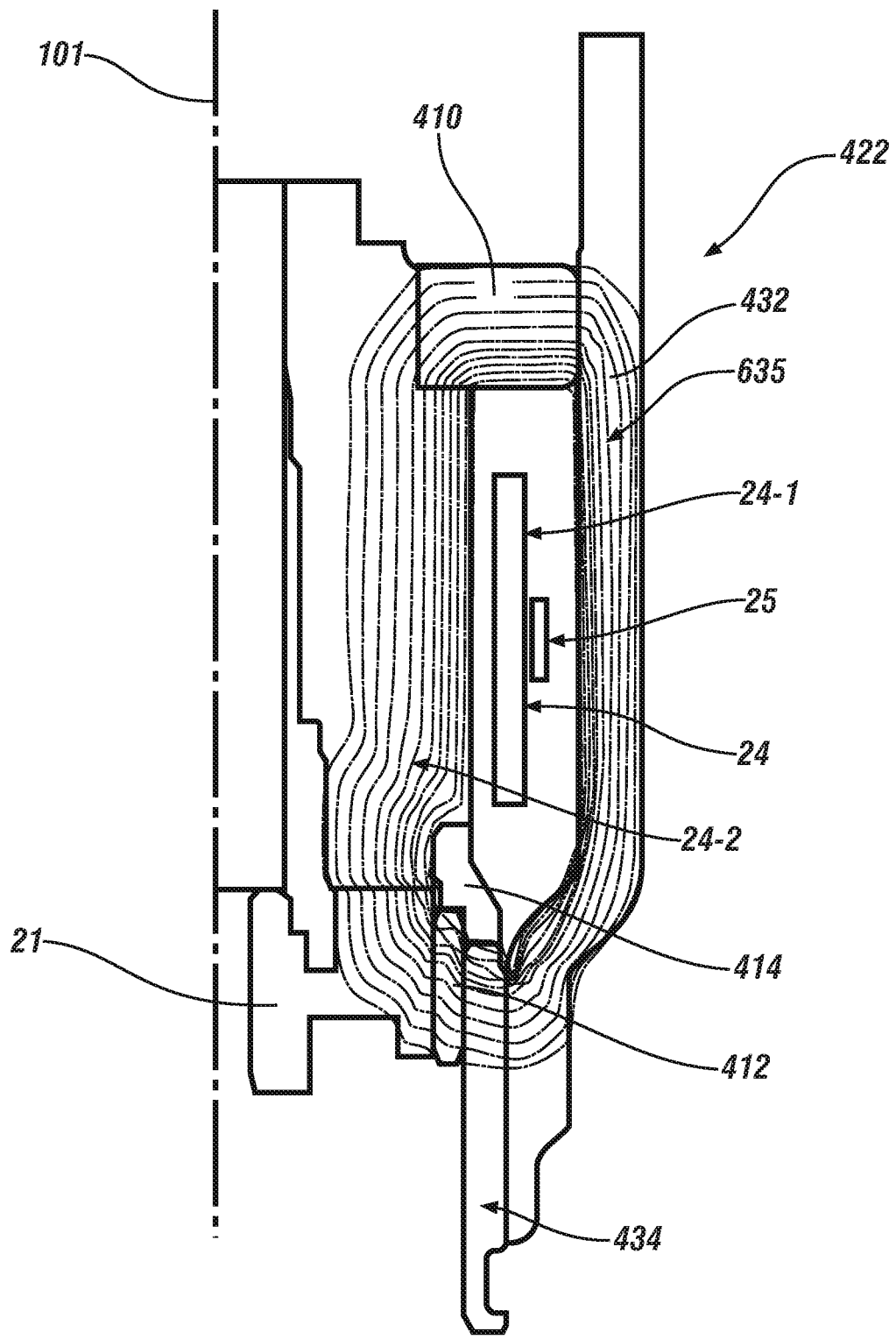
Figures 3, 6:
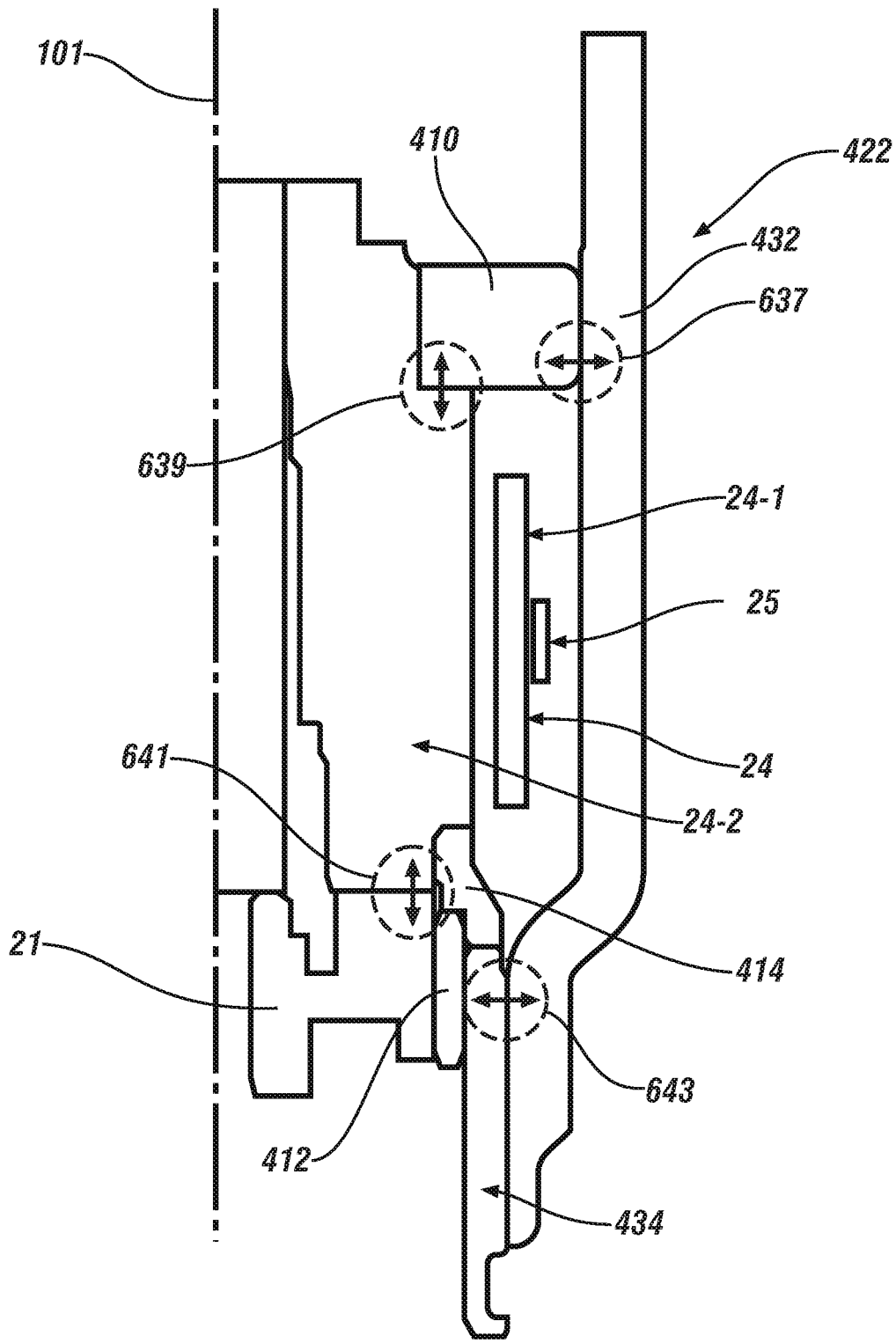

FIG. 6-1 illustrates transient flux concentration along a magnetic flux flow path in a schematic sectional detailed view of area 422 of FIG. 4. Transient current through the electrical coil 24-1 is a high frequency current which results in limited penetration of magnetic flux into the magnetic core 24-2 and the flux return path components, including flux connector 410, actuator housing 432, collar 434, guide ring 412 and armature 21, measured relative to the electrical coil 24-1. In an exemplary embodiment high frequency (transient) current may be defined as current rise in the range of 10,000 Amperes/second to 500,000 Amperes/second and a current fall ranging from 10,000 Amperes/second to 2,000,000 Amperes/second. Such a high frequency excitation of the electrical coil 24-1 results in transient flux concentration in regions of the magnetic flux path. This transient flux concentration effect is illustrated by the magnetic flux lines 633 along the magnetic flux path. The magnetic flux lines 633 are concentrated and have limited penetration into the components of the magnetic flux path. Eddy currents resulting from the high frequency current prevent deep penetration of the magnetic field into the ferrous components of the magnetic flux path and the magnetic flux is concentrated toward the surfaces of the ferrous components proximate to the electrical coil 24-1 during periods of transient current. This transient flux concentration occurs subsequent to a steady state actuator coil current of essentially zero, and when a certain rate of change, indicative of a high frequency (transient) current, is achieved in the current through the electrical coil.

FIG. 6-2 illustrates magnetic flux along a magnetic flux flow path during steady state in a schematic sectional detailed view of area 422 of FIG. 4. During steady state actuator coil current the magnetic flux achieves greater penetration with less flux concentration than results from the aforementioned high frequency (transient) currents. This steady state actuator coil current is illustrated by magnetic flux lines 635 along the magnetic flux path. The magnetic flux lines 635 penetrate further into the components of the magnetic flux path including the magnetic core 24-2 and the flux return path components, including flux connector 410, actuator housing 432, collar 434, guide ring 412 and armature 21, measured relative to the electrical coil 24-1.

FIG. 6-3 illustrates a non-limiting exemplary embodiment of a schematic sectional detailed view including magnetic field sensor locations within area 422 of the fuel injector 10 of FIG. 4. The longitudinal axis 101 indicates an axis of symmetry for the fuel injector 10. The armature portion 21, guide ring 412, spacer 414, flux connector 410, collar 434 and electromagnetic assembly 24, including magnetic core 24-2 and electrical coil 24-1, are depicted in the illustrated embodiment of FIG. 6 within area 422 of the fuel injector 10.

Each of the predetermined locations 637, 639, 641 and 643 indicate a location within the fuel injector 10 that a magnetic field sensor can be disposed for measuring magnetic flux within the fuel injector. In a preferred embodiment these predetermined locations fall within regions of transient flux concentration as depicted in FIG. 6-1. Placement of the magnetic field sensors within regions of transient flux concentration ensures that magnetic flux along the magnetic flux path is accurately measured. Placement of magnetic field sensors outside of these transient flux concentration regions may result in the magnetic field sensors not registering magnetic flux having low penetration during periods of high frequency (transient) current through the electrical coil 24-2. Accordingly, any one of the predetermined locations 637, 639, 641 and 643 can be selected to dispose a magnetic field sensor for measuring magnetic flux. The predetermined locations 637, 639, 641 and 643 commonly include locations within the magnetic flux path that is generated when the electrical coil 24-1 is energized. Exemplary predetermined sensor locations 637, 639, 641 and 643 include locations within the magnetic flux path that are located in the regions of transient flux concentration as discussed with respect to FIGS. 6-1 and 6-1.

The first predetermined location 637 is adjacent to both the flux connector 410 and the actuator housing 432 of body 12 of the fuel injector 10. The second predetermined location 639 is adjacent to the flux connector 410 and a magnetic core 24-2 of the fuel injector 10. Disposing a magnetic field sensor at either of the first and second predetermined locations 637, 639, respectively, alleviates packaging constrains since terminal leads of magnetic field sensors disposed thereon can be fed to the flux connector 410 without having to be routed through components of the fuel injector. The third predetermined location 641 is located within the cavity of the fuel injector adjacent to the magnetic core 24-2 and armature 21 or proximate to an air gap of the armature portion 21. Advantageously, a magnetic field sensor disposed at the third predetermined location 641 can measure the magnetic flux that exiting normal to the armature portion. The fourth predetermined location 643 is located between the collar 434 and the actuator housing 432 of the fuel injector. Advantageously, a magnetic field sensor disposed at the fourth predetermined location 643 can measure magnetic flux circulating from the electrical coil 24-1 passing through the armature portion 21. Embodiments herein are not limited to any one of the predetermined locations 637, 639, 641 and 643, wherein any one of which can be utilized based upon accuracy in magnetic flux measurements and packaging considerations. In some embodiments, a respective magnetic field sensor can be disposed at more than one of the predetermined locations 637, 639, 641 and 643 to provide more robust measurements of magnetic flux.

The type of the magnetic field sensor is chosen such that the thickness of the sensor will not significantly affect the magnetic reluctance of the magnetic flux path. It will be appreciated that terminal leads of the magnetic field sensor run along the terminal leads of the electrical coil 24-1 for electrical coupling at the flux connector 410. Accordingly, measurements obtained by the magnetic field sensor can be interfaced with the control module 60 via the feedback signal(s) 42. In one embodiment, the magnetic field sensor is a Hall sensor responsive to the magnetic flux density at a respective one of the predetermined locations 1-4 for measuring the magnetic flux. Other possible magnetic field sensors include, but are not limited to, analog Hall sensors and Magnetoresistive (MR) type sensors. The magnetic field sensors are preferably positioned such that a sensing axis of the magnetic field sensor is normal to the flow of magnetic flux. This disclosure is not limited to any one type of magnetic field sensor for measuring magnetic flux.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An electromagnetic actuator, comprising:
   an electrical coil;
   a high permeability magnetic flux path comprising:
      a magnetic core;
      an armature;
      a flux return structure; and
   a flux sensor integrated within the actuator and configured to detect a magnetic flux within the high permeability magnetic flux path.

2. The electromagnetic actuator of claim 1, wherein the flux sensor comprises a search coil immediately adjacent to the electrical coil and surrounding the magnetic core.

3. The electromagnetic actuator of claim 2, wherein the search coil is radially adjacent the electrical coil.

4. The electromagnetic actuator of claim 2, wherein the search coil is axially adjacent the electrical coil.

5. The electromagnetic actuator of claim 1, wherein the flux sensor comprises a hall effect sensor integrated within the high permeability magnetic flux path.

6. The electromagnetic actuator of claim 1, wherein the flux sensor comprises a magnetoresistive sensor integrated within the high permeability magnetic flux path.

7. The electromagnetic actuator of claim 1, wherein the flux sensor comprises a magnetic field sensor integrated within the flux return structure.

8. The electromagnetic actuator of claim 1, wherein the flux sensor comprises a magnetic field sensor integrated at an interface of the flux return structure and the magnetic core.

9. The electromagnetic actuator of claim 1, wherein the flux sensor comprises a magnetic field sensor integrated at an interface of the magnetic core and armature.

10. The electromagnetic actuator of claim 1, wherein the flux return structure comprises at least two immediately adjacent high permeability components, and the flux sensor comprises a magnetic field sensor integrated within the flux return structure at an interface of said at least two immediately adjacent high permeability components.

11. The electromagnetic actuator of claim 1, wherein the high permeability magnetic flux path comprises a region of flux concentration during high frequency excitation of the electrical coil, and the flux sensor comprises a magnetic field sensor integrated within said region of flux concentration during high frequency excitation of the electrical coil.

12. The electromagnetic actuator of claim 11, wherein the flux return structure comprises at least two immediately adjacent high permeability components, and the flux sensor comprises a magnetic field sensor integrated within the flux return structure at an interface of said at least two immediately adjacent high permeability components that is characterized by said region of flux concentration during high frequency excitation of the electrical coil.

13. An electromagnetic fuel injector, comprising:
   an electrical coil;
   a high permeability magnetic flux path comprising:
      an armature translatable along an axis;
      a magnetic core surrounded by the electrical coil, said magnetic core having a first end adjacent said armature for imparting attractive magnetic force thereto and an axially opposite second end;
      a flux return structure comprising:
         a cylindrous housing surrounding said electrical coil and having an inner wall surface;

an annular member arranged between the inner wall surface of the housing and the second end of the magnetic core such that a first touching interface is between the annular member and the inner wall surface of the housing and a second touching interface is between the annular member and second end of the magnetic core; and a flux sensor integrated within the fuel injector and configured to detect a magnetic flux within the high permeability magnetic flux path.

14. The electromagnetic actuator of claim 13, wherein the flux sensor comprises a search coil immediately adjacent to the electrical coil and surrounding the magnetic core.

15. The electromagnetic actuator of claim 14, wherein the search coil is radially adjacent the electrical coil.

16. The electromagnetic actuator of claim 14, wherein the search coil is axially adjacent the electrical coil.

17. The electromagnetic actuator of claim 13, wherein the flux sensor comprises a hall effect sensor integrated within the high permeability magnetic flux path.

18. The electromagnetic actuator of claim 13, wherein the flux sensor comprises a magnetoresistive sensor integrated within the high permeability magnetic flux path.

19. The electromagnetic actuator of claim 13, wherein the flux sensor comprises a magnetic field sensor integrated within the flux return structure.

20. The electromagnetic actuator of claim 13, wherein the flux sensor comprises a magnetic field sensor integrated at one of the first and second touching interfaces of the flux return structure.

21. The electromagnetic actuator of claim 13, wherein the flux sensor comprises a magnetic field sensor integrated at the first end of the magnetic core.

22. The electromagnetic actuator of claim 13, wherein the flux return structure comprises a magnetic field sensor integrated within the flux return structure at an interface of two immediately adjacent high permeability components.

23. The electromagnetic actuator of claim 13, wherein the high permeability magnetic flux path comprises a region of flux concentration during high frequency excitation of the electrical coil, and the flux sensor comprises a magnetic field sensor integrated within said region of flux concentration during high frequency excitation of the electrical coil.

24. The electromagnetic actuator of claim 23, wherein the magnetic field sensor is integrated at one of the first and second touching interfaces of the flux return structure.

25. The electromagnetic actuator of claim 13, wherein the second end of the magnetic core comprises a shoulder having a surface normal to the axis and providing a magnetic core surface of the second touching interface between the annular member and second end of the magnetic core, and wherein the flux sensor comprises a magnetic field sensor integrated at the second touching interface between the annular member and second end of the magnetic core.

26. The electromagnetic actuator of claim 13, wherein the flux return structure further comprises a high permeability structure arranged between the inner wall surface of the housing and the armature such that a first touching interface is between the high permeability structure and the inner wall surface of the housing and a second touching interface is between the high permeability structure and the armature, and wherein the flux sensor comprises a magnetic field sensor integrated at the first touching interface between the high permeability structure and the inner wall surface of the housing.

* * * * *